US012613579B2

(12) United States Patent
Hastings

(10) Patent No.: US 12,613,579 B2
(45) Date of Patent: Apr. 28, 2026

(54) TOUCHLESS SCANNING HAPTIC FEEDBACK SYSTEM AND METHOD

(71) Applicant: The Government of the United States of America, as represented by the Secretary of Homeland Security, Washington, DC (US)

(72) Inventor: William Hastings, Billings, MT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/664,083

(22) Filed: May 14, 2024

(65) Prior Publication Data

US 2024/0411372 A1     Dec. 12, 2024

Related U.S. Application Data

(60) Provisional application No. 63/471,803, filed on Jun. 8, 2023.

(51) Int. Cl.
| | |
|---|---|
| *G06F 3/01* | (2006.01) |
| *G06V 10/44* | (2022.01) |
| *G06V 10/74* | (2022.01) |

(52) U.S. Cl.
CPC .............. *G06F 3/016* (2013.01); *G06F 3/014* (2013.01); *G06V 10/44* (2022.01); *G06V 10/761* (2022.01); *G06V 2201/07* (2022.01)

(58) Field of Classification Search
CPC ......... G06F 3/016; G06F 3/014; G06V 10/44; G06V 10/761; G06V 2201/07
See application file for complete search history.

(56) References Cited

U.S. PATENT DOCUMENTS

| | | | | |
|---|---|---|---|---|
| 9,104,271 | B1 * | 8/2015 | Adams | .................. G06F 3/0233 |
| 9,349,182 | B2 | 5/2016 | Milch | |
| 9,977,498 | B2 | 5/2018 | Maschmeyer et al. | |
| 11,304,771 | B2 | 4/2022 | Panescu et al. | |
| 2014/0320276 | A1 * | 10/2014 | Maschmeyer | .......... G06F 3/041 |
| | | | | 340/407.2 |
| 2023/0214079 | A1 * | 7/2023 | Lee | ..................... G06F 3/04164 |
| | | | | 345/173 |
| 2023/0251720 | A1 * | 8/2023 | Wren | .................. G06F 3/04883 |
| | | | | 715/702 |

OTHER PUBLICATIONS

A Novel Untethered Hand Wearable with Fine-Grained Mbp) Cutaneous Haptic Feedback Mar. 1, 2022 (Year: 2022).*

(Continued)

*Primary Examiner* — Cao H Nguyen
(74) *Attorney, Agent, or Firm* — Kelly G. Hyndman; Robert W. Busby; William Washington

(57) ABSTRACT

In an example, a touchless scanning haptic feedback device includes a touchless sensor system to detect a contour of a target, at a distance to produce sensor data, the target being at least one of a person or an object; and a tactile simulation system to physically relay the detected contour to a user by generating haptic feedback based on the sensor data and simulating haptic feedback virtual sensation of touch based on the generated haptic feedback which is indicative of the detected contour of the target.

27 Claims, 6 Drawing Sheets

(56) References Cited

OTHER PUBLICATIONS

"The haptic laser: multi-sensation tactile feedback for at-a-distance physical space perception and interaction" May 7, 2011 (Year: 2011).*

Muhammad Miftahul Munir et al., "Design of 3D Scanner for Surface Contour Mapping by Ultrasonic Sensor," AIP Conference Proceedings 1656, 040006 (Apr. 2015), http://dx.doi.org/10.1063/1.4917113.

Oliver Ozioko, et al., "Wearable Assistive Tactile Communication Interface Based on Integrated Touch Sensors and Actuators," IEEE Transactions on Neural Systems and Rehabilitation Engineering, vol. 28, No. 6, Jun. 2020, pp. 1344-1352.

Christoph W. Borst and Charles D. Cavanaugh, "Haptic Controller Design and Palm-sized Vibrotactile Array," EuroHaptics 2004, pp. 344-347, https://vrlab.cmix.louisiana.edu/papers/CWB_CDC_Report_July_2004.

Alexander CO Abad et al., "A Novel Untethered Hand Wearable with Fine-Grained Cutaneous Haptic Feedback," Sensors, 2022, 22(5), 1924, https://doi.org/10.3390/s22051924 (published Mar. 1, 2022).

Cagatay Basdogan et al., "A Review of Surface Haptics: Enabling Tactile Effects on Touch Surfaces," IEEE Transactions on Haptics, vol. 13, No. 3, pp. 450-470, Jul.-Sep. 2020, doi: 10.1109/TOH.2020.2990712, https://ieeexplore.ieee.org/stamp/stamp.jsp?tp=&arnumber=9079589.

* cited by examiner

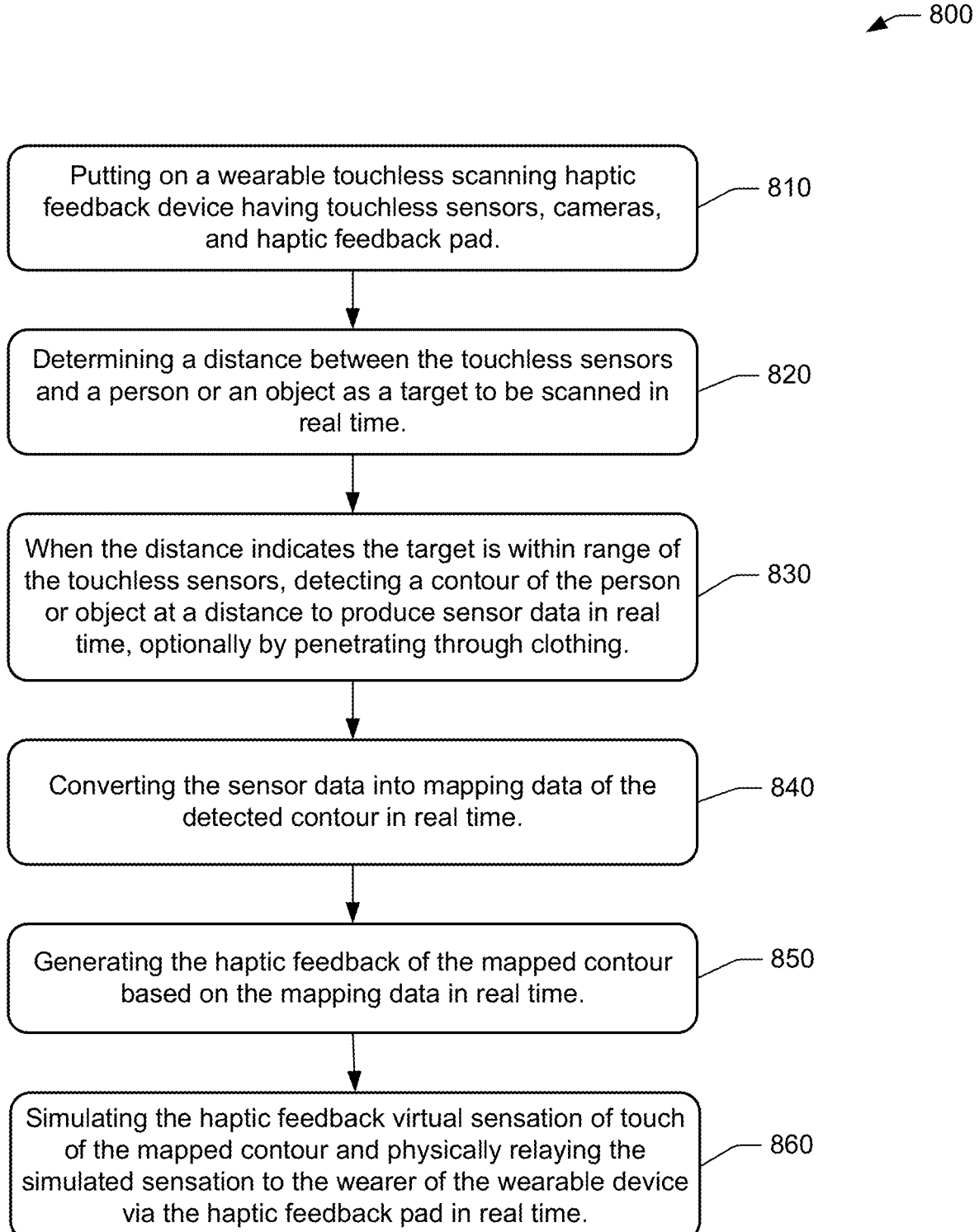

— 800

Putting on a wearable touchless scanning haptic feedback device having touchless sensors, cameras, and haptic feedback pad. — 810

Determining a distance between the touchless sensors and a person or an object as a target to be scanned in real time. — 820

When the distance indicates the target is within range of the touchless sensors, detecting a contour of the person or object at a distance to produce sensor data in real time, optionally by penetrating through clothing. — 830

Converting the sensor data into mapping data of the detected contour in real time. — 840

Generating the haptic feedback of the mapped contour based on the mapping data in real time. — 850

Simulating the haptic feedback virtual sensation of touch of the mapped contour and physically relaying the simulated sensation to the wearer of the wearable device via the haptic feedback pad in real time. — 860

FIG. 8

TOUCHLESS SCANNING HAPTIC FEEDBACK SYSTEM AND METHOD

CROSS-REFERENCE TO RELATED APPLICATIONS

The application claims the benefit of priority from U.S. Provisional Patent Application No. 63/471,803, filed Jun. 8, 2023, entitled TOUCHLESS SCANNING HAPTIC FEEDBACK SYSTEM AND METHOD, the disclosure of which is incorporated by reference in its entirety.

SUMMARY STATEMENT OF GOVERNMENT INTEREST

The present invention was made with support from the United States Department of Homeland Security (DHS) and by an employee of DHS in the performance of their official duties. The U.S. Government has certain rights in this invention.

FIELD

The discussion below relates generally to haptic systems and methods and, more particularly, to the use of touchless scanning to generate haptic feedback virtual sensation of touch.

BACKGROUND

Virtual reality (VR) and augmented reality (AR) are revolutionary technologies, aiming at creating virtual environments that allow human to obtain various feelings almost like real experiences in the physical world. The VR/AR-enabled digitalized world can bring users an immersive experience of interacting with reality by simulating human sensations. To establish an immersive VR/AR system, besides visual stimulus enabled by head-mounted displays, other wearable devices (e.g., data gloves, VR/AR suits, etc.) that can simultaneously sense human motion and simulate human sensation, are experiencing significant attention recently for full-body perception and feedback to further bridge the physical and cyber worlds. Compared with the simulated feelings of sight, hearing, and smell, virtual tactile sensing is much more difficult to be realized because it requires a fast-response, high-resolution, bio-friendly, and large-sized tactile stimulation technique, while it is the crucial element for distinguishing VR/AR system from other immersive video techniques.

The sensory and motor nerves of the hand are more complex than other body parts, providing fingers with high flexibility to realize complex interactions in VR/AR systems. Current mature sensing techniques for finger motion tracking involve conventional rigid solutions based on cameras and inertial measurement units, and flexible solutions using stretchable and flexible materials based on the mechanisms of resistivity, capacity, and optical fiber, etc. To further lower the device power consumption, self-powered sensing mechanisms, including triboelectricity, piezoelectricity, thermoelectricity and pyroelectricity, also reveal their unique advantages in developing the long-term sustainable portable system.

Heretofore, virtual tactile sensing has involved creating the sensation of touching a digital object simulated in virtual reality to feel its surface topography.

SUMMARY

Embodiments of the present invention are directed to haptic feedback virtual sensation system and method to provide touchless sensing of the contours of persons and objects to produce sensing data and physically relaying the detected contours to the user by generating haptic feedback based on the sensing data and simulating haptic feedback virtual sensation of touch based on the generated haptic feedback. The haptic feedback is indicative or representative of the detected contour of the target.

In specific embodiments, a haptic feedback virtual sensation system comprises a wearable system that fits over the user's hand. On the wearable system exterior surface (or front surface) is a touchless sensor system (e.g., MMW (Millimeter Wave), LiDAR (Light Detection and Ranging), Backscatter X-Ray) and on the wearable system interior surface (or rear surface) touching the user's hand is a haptic feedback system. The exterior sensor system senses and maps the contour of a person or an object at a distance. The mapping information is then physically relayed to the user through a haptic feedback system. Essentially, this would allow the user to "feel" the contour of the person or object without actually touching the person or object. Generating the mapping information and physically relaying it to the user can be performed in real time. As used herein, performing a step or a process or a function "in real time" means processing the input or input data to complete the step or process or function within a second or, in some embodiments, within milliseconds, or, in specific embodiments, within microseconds.

The haptic feedback virtual sensing is useful in different applications. For instance, in the context of security screening of a person, the screener can use the haptic feedback virtual sensation system to feel any objects on the person without physically touching the person. This is a less invasive screening method and eliminates the need for the touchless sensor system to output an image of the scanned person/object for privacy reasons. Such an image-free system can also be useful to visually impaired individuals, who can "feel" their surrounding without making physical contact.

In accordance with an aspect, a touchless scanning haptic feedback device comprises a touchless sensor system to detect a contour of a target, at a distance to produce sensor data, the target being at least one of a person or an object; and a tactile simulation system to physically relay the detected contour to a user by generating haptic feedback based on the sensor data and simulating haptic feedback virtual sensation of touch based on the generated haptic feedback which is indicative of the detected contour of the target.

In accordance with another aspect, a touchless scanning haptic feedback method comprises detecting a contour of a target at a distance to produce sensor data, the target being at least one of a person or an object; and physically relaying the detected contour to a user by generating haptic feedback based on the sensor data and simulating haptic feedback virtual sensation of touch based on the generated haptic feedback which is indicative of the detected contour of the target.

In accordance with yet another aspect, a wearable touchless scanning haptic feedback device comprises: a touchless sensor system to detect a contour of a target, at a distance to produce sensor data, the target being at least one of a person or an object; and a tactile simulation system to physically relay the detected contour to at least one of a palm or a finger of an operator's hand by generating haptic feedback based on the sensor data, simulating haptic feedback virtual sensation of touch based on the generated haptic feedback which is indicative of the detected contour of the target, and applying the haptic feedback virtual sensation of touch via physical contact with the at least one of the palm or the finger of the operator's hand.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 8 is a flow diagram illustrating an example of a touchless scanning haptic feedback method.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figures 1, 2:
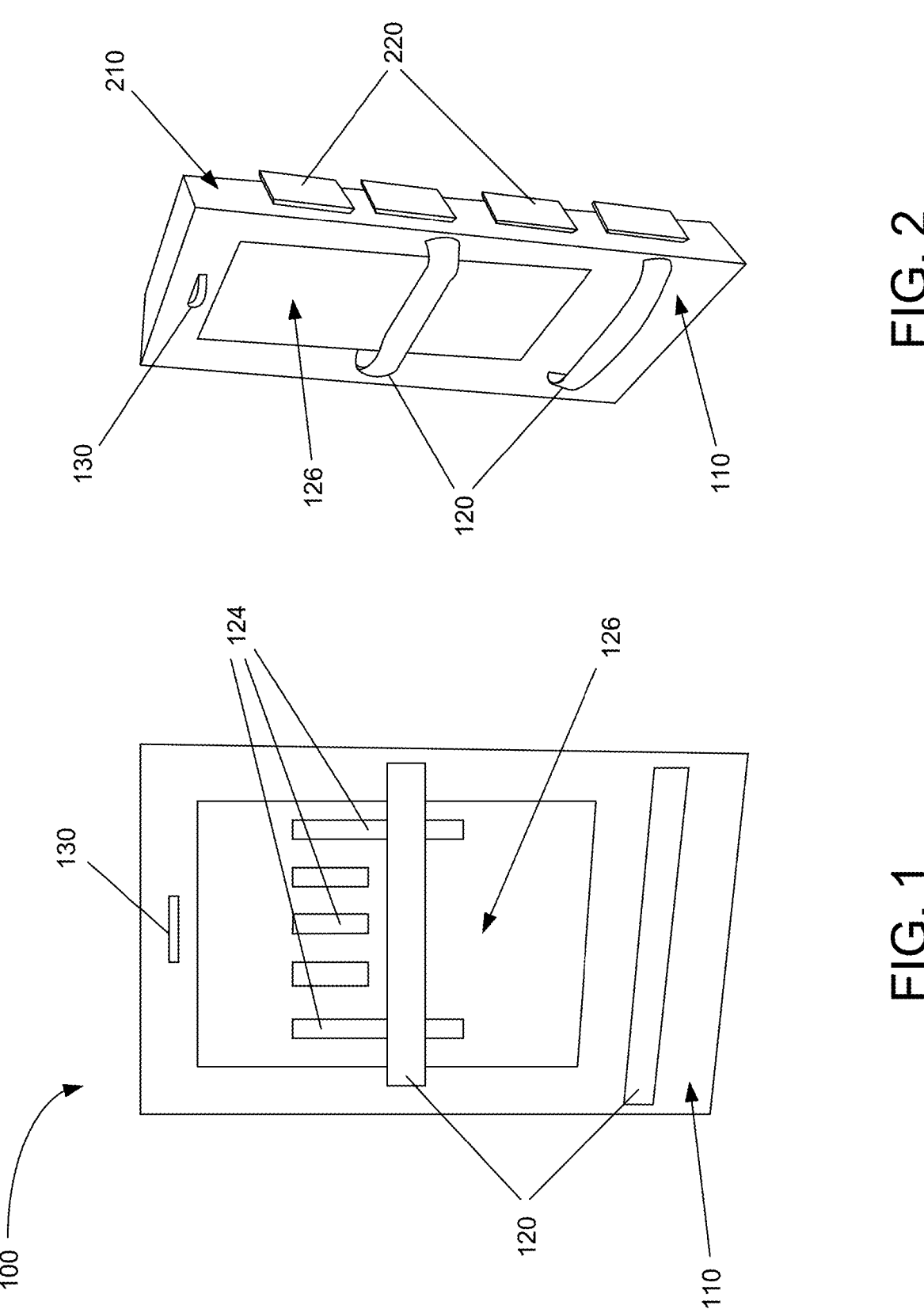
FIG. 1 illustrates a rear view of an example of a touchless scanning haptic feedback device.
FIG. 2 illustrates a side perspective view of the touchless scanning haptic feedback device of FIG. 1.

FIG. 1 illustrates a rear view of an example of a touchless scanning haptic feedback device. The touchless scanning haptic feedback device 100 may be a wearable device having a rear surface 110 on the device interior to be held against the palm and fingers of the hand of a user or operator. One or more straps 120 may be used to secure the device 100 to the user's hand. The rear surface 110 includes a plurality of ridges 124 to be positioned between and/or around the four fingers. The ridges may be physical elevations serving as mechanical spacers which can be moved inward or outward using a dial 130; turning of the dial 130 will adjust the spacing between fingers of different sizes to accommodate or fit a variety of users having differently sized hands. As such, the positions of the plurality of ridges are adjustable to accommodate fingers of different sizes of a variety of users. In another embodiment, the elevation of the ridges 124 can be collectively and/or individually adjusted as well.

The user's hand is placed on a haptic feedback surface or pad 126 to receive the palm and fingers which may or may not include the thumb. FIG. 1 shows a generally planar haptic feedback pad 126. In other embodiments, a contoured pad indented with the shape of the palm and/or fingers of a hand may be used instead. The haptic feedback pad 126 provides haptic feedback to imitate the sensation of touch. The haptic feedback is indicative or representative of the detected contour of the target.

Figures 3, 4:
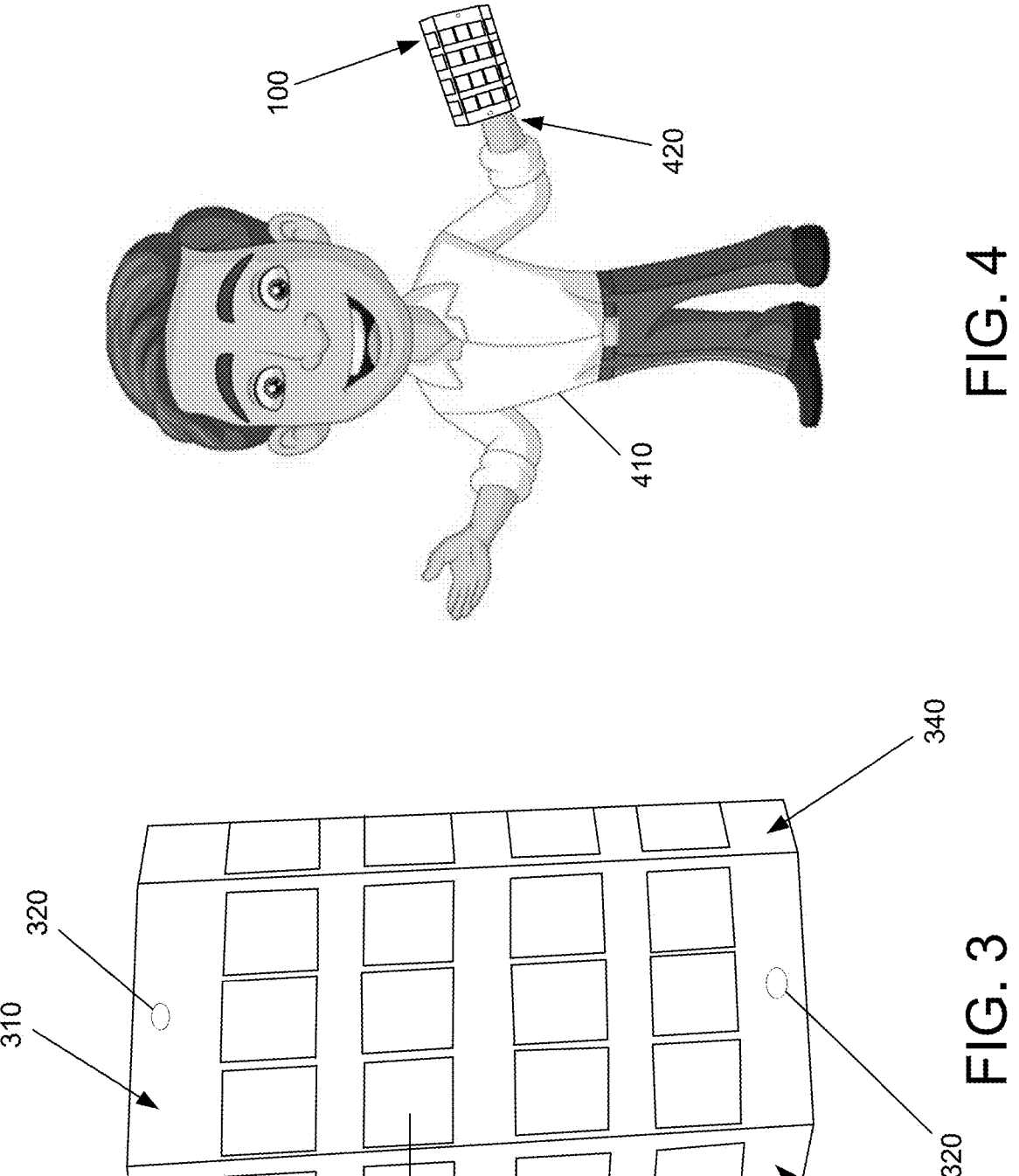
FIG. 3 illustrates a front view of the touchless scanning haptic feedback device of FIG. 1.
FIG. 4 illustrates a user holding the touchless scanning haptic feedback device of FIG. 1 in his or her hand.

FIG. 2 illustrates a side perspective view of the touchless scanning haptic feedback device of FIG. 1. FIG. 3 illustrates a front view thereof. The touchless scanning haptic feedback device 100 includes a first side surface 210, a front surface 310 on the device exterior, and a second side surface 340. The first side surface 210 and the second side surface 340 may be slanted or inclined forward as shown. A plurality of touchless sensors 220 are provided on the first side surface 210, front surface 310, and second side surface 340. The sensors 220 can detect contours of objects or a person and any objects on the person at a distance to produce sensor data or sensing data in real time to be used for mapping the contours.

Examples of the touchless sensors 220 include MMW (Millimeter Wave), LiDAR (Light Detection and Ranging), and Backscatter X-Ray sensors. MMW sensors have the ability to sense contours of a person and objects on the person by penetrating through clothing. Millimeter waves are electromagnetic (radio) waves typically defined to lie within the frequency range of 30-300 GHz. Unlike X-ray equipment, MMW scanning gives excellent penetration of low-density matter such as clothes while the low-energy waves are harmless to human cells. In specific embodiments, the body surface can be scanned accurately from a distance of about one meter, permitting reliable detection items hidden under clothes. In addition to inherent safety and convenience, millimeter waves can detect items such as ceramic weapons, liquids, explosives, or drugs that would be invisible to equipment such as metal detectors commonly used for security screening. In this embodiment, the sensors 220 are generally rectangular or square in shape, are generally uniform in size, and are arranged in a generally rectangular pattern. In other embodiments, the shape, size, and arrangement of the sensor 220 may change and be adapted to other environments and conditions (e.g., various shapes including circular, oval, and polygonal; variable sizes; and/or a pattern that is adapted to the user's hand and/or the target(s)).

The sensors 220 may be configured as transceiver chips. One or more cameras 320 may be provided on the front surface 310 to produce visual data used to determine the distance between the sensors 220 and the person or objects to be scanned. FIG. 3 shows cameras 320 near the top and near the bottom of the device 100 to generate visual data for determining distances (e.g., by triangulation) using software in the device 100 programmed to determine such distances. The touchless sensors 220 may be activated only when the distance determined based on the camera visual data indicates that the person or objects to be scanned are within range of the sensors 220. This can be accomplished automatically by a controller in the device 100 or manually by the user or operator who will activate the touchless sensor

220 upon notification (e.g., by audio, visual, or vibrational feedback) that the scanning target is within range.

A mapping software can be used to convert the sensor data or scanned image data as sensor input by computation into mapping data of the contours based on the sensor data. This can be done in real time. An example involving optical imaging is U.S. Pat. No. 9,349,182 for 3D INTRAORAL MEASUREMENTS USING OPTICAL MULTILINE METHOD, which is incorporated herein by reference in its entirety. The patent discloses a method for mapping a sensor pixel array to an illumination pixel array according to a surface which forms a group mapping by assigning each pixel to a corresponding group, each group with p adjacent pixels on the illumination array and each ordered set having k groups, by projecting and recording a sequence of group index images. In general, the sensor data may not involve imaging. The sensor data may include x and y coordinates of a reference plane and depth. For example, MATLAB can be used to analyze the sensor data to generate mapping data of the contours.

MMW systems can be programmed to scan a target and create a 3D map of the sensed target. Examples include mmW Pro Vision ATD (Advanced Threat Detection) system used by TSA as an image-free solution for body scanning of passengers in a single stationary position and QPS (Quick Personnel Security) scanner such as R&S® QPS200 or R&S® QPS201 which uses low-energy millimeter waves to fully scan the body. The touchless scanning haptic feedback device 100 employs the MMW technology for image-free scanning in a wearable haptic feedback configuration.

Figures 5, 6:
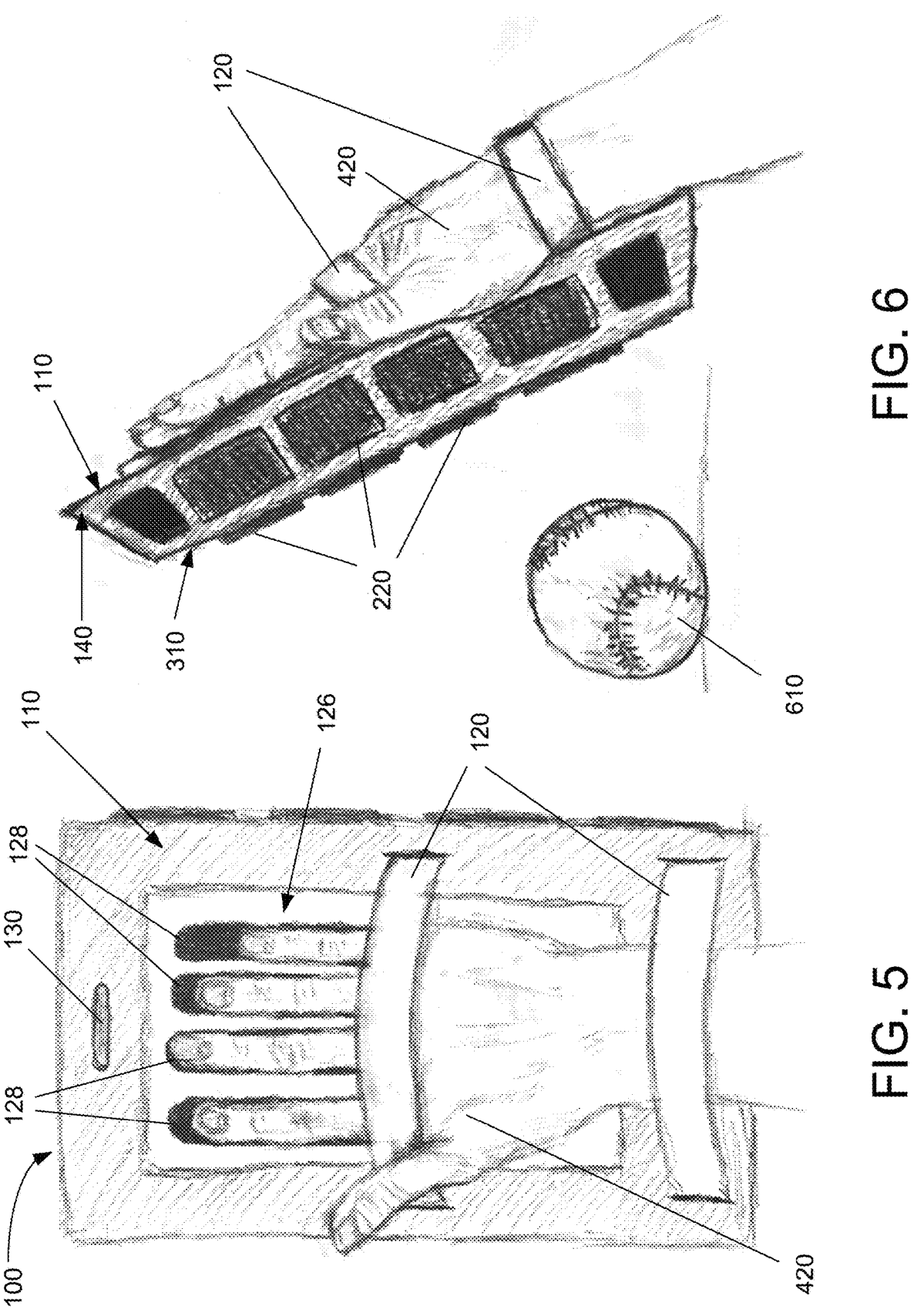
FIG. 5 is a rear view of the touchless scanning haptic feedback device of FIG. 1 illustrating the hand of the user holding the device with the palm and fingers in contact with the rear surface of the device.
FIG. 6 is a side view of the touchless scanning haptic feedback device of FIG. 5 illustrating the hand of the user holding the device.

FIG. 4 illustrates a user 410 holding the touchless scanning haptic feedback device 100 of FIG. 1 in his or her hand 420. FIG. 5 is a rear view of the touchless scanning haptic feedback device 100 of FIG. 1 illustrating the hand 420 of the user 410 holding the device with the palm and fingers in contact with the rear surface 110 of the device 100. The hand 420 is secured to the device 100 using two straps 120. In the embodiment shown, the first strap is secured generally across the knuckles of the four fingers of the hand 420 and the second strap is secured generally across the wrist of the user 410. The four fingers are aligned with four haptic feedback grooves 128 as part of the contoured haptic feedback surface or pad 126, as discussed above, to imitate the sensation of touch via a haptic interface between the haptic feedback surface 126 and the hand 420. The haptic feedback pad 126 may include on its surface the haptic interface to simulate the haptic feedback virtual sensation of touch to the palm and/or one or more of the fingers of the hand of the user.

A variety of haptic interfaces are contemplated. They include force feedback devices having the capacity to physically interface with the user's hand. Tactile display systems employing mechanical, electrical, or thermal stimulation can be used to provide tactile sensation to the skin of the user. An example is a texture explorer including a 2×5 flat pin array composed of piezoelectric actuators and operating at a fixed frequency (~250 Hz) with a maximum amplitude of 22 μm. Another example is a broadband tactile array using piezoelectric bimorphs for stimulation frequencies of 40 Hz and 320 Hz with a maximum displacement of 50 μm. Another example is a 5×6 pin-array tactile display which has a small size, long travel, and high bandwidth. Another example uses an electroactive polymer as an actuator for mechanical stimulation, such as a high-voltage electrocutaneous stimulator with small electrodes or a nerve axon model based on the properties of human skin with an electrocutaneous display using anodic and cathodic current stimulation. In yet another example, a haptic device may provide both force and tactile feedback simultaneously. It may be realized as a compact pin-array to provide a combination of force feedback and tactile display based on the display and vibrations. Mechanical pins can imitate the sense of touch by using the amount of protrusion to give a sense of depth. Vibrational sensory feedback may employ thousands of vibrating nodes with different intensities, in which the vibration wavelength of each individual vibrating node simulates how deeply it penetrates the user's hand. A shorter wavelength represents a lighter touch while a longer wavelength represents a deeper penetration resulting in the illusion of more or less pressure on the user's hand, as used in massagers in lighter or deeper stimulation.

Yet another example involves turning ultrasound into virtual touch. It all starts with one small ultrasound speaker. The small speaker emits ultrasound waves, which are too high a frequency for humans to hear. A plurality of the small speakers are assembled together to create an array. Every ultrasound speaker in the array can be individually controlled. Each individual speaker is triggered at a different time. The ultrasound speakers are triggered with specific time differences using specific algorithms. The time differences mean the ultrasound waves arrive at the same point in space, at the same time. The place where all the ultrasound waves coincide is called the focal point. Where the focal point is positioned in 3D space is programmable in real time. It can change position from instant to instant. A hand tracking device can track the exact position of a person's hand and position the focal point at a spot on it. The combined ultrasound waves have enough force to create a tiny dent in the person's skin. The pressure point is used to create a vibration that touch sensors in the person's hands can detect. By moving the pressure points around, tactile effects can be created in mid-air. The pressure points can be used to create a wide range of tactile effects—from sculpting virtual lines and shapes to forming 3D controls in mid-air. See ultraleap.com.

FIG. 6 is a side view of the touchless scanning haptic feedback device 100 of FIG. 5 illustrating the hand 420 of the user 410 holding the device 100. The palm and fingers of the user's hand are in contact with the rear surface 110 of the device and the front surface 310 of the device faces and performs touchless sensing of an object 610 at a distance using the touchless sensors 220.

Figure 7:
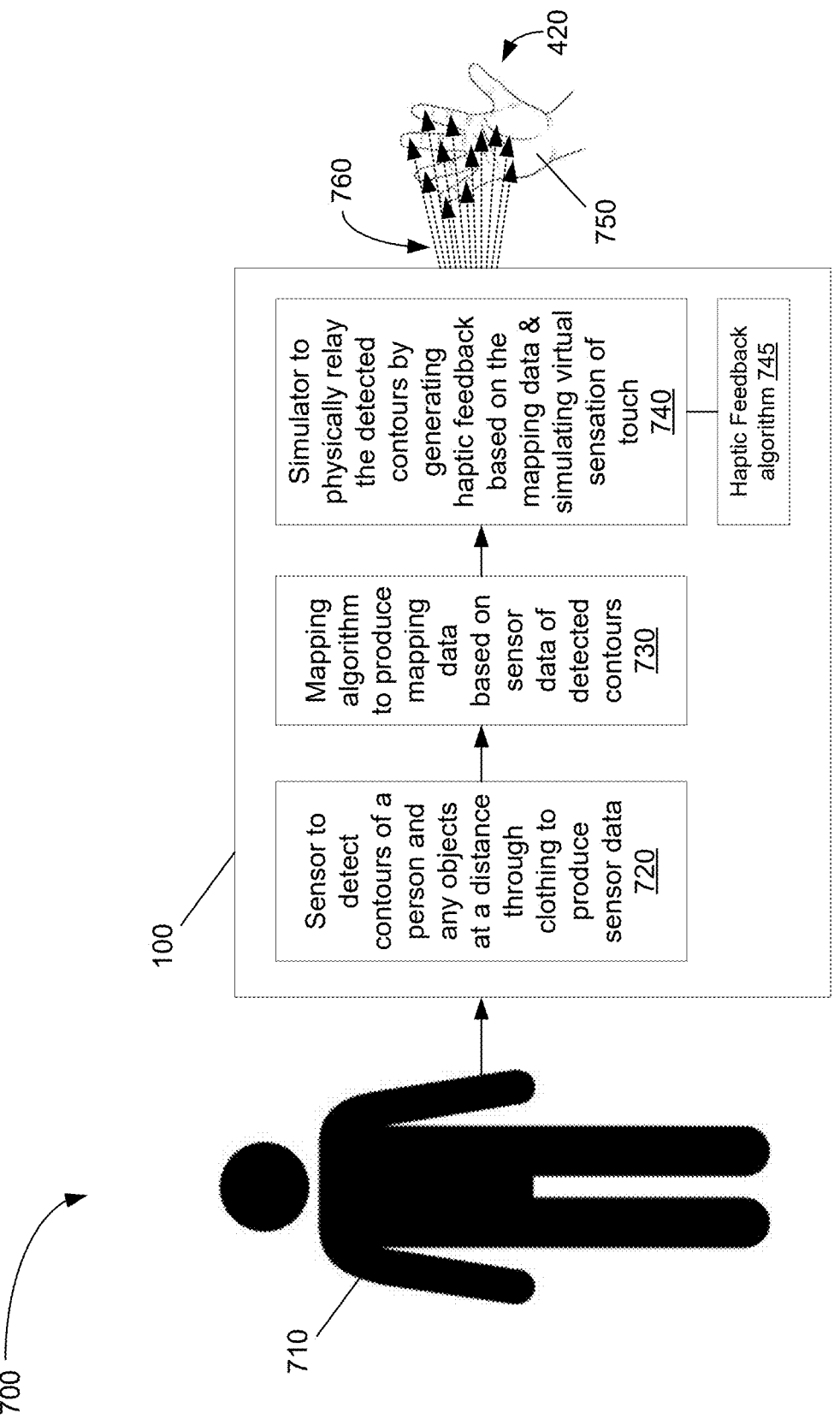
FIG. 7 is a block diagram of the touchless scanning haptic feedback device for detecting and mapping contours of a person and any objects and physically relaying the detected and mapped contours to the palm and/or fingers of an operator's hand via haptic feedback virtual sensation of touch.

FIG. 7 is a block diagram of the touchless scanning haptic feedback device for detecting and mapping contours of a person and any objects and physically relaying the detected and mapped contours to the palm and/or fingers of an operator's hand via haptic feedback virtual sensation of touch. The touchless scanning haptic feedback device 100 is held by the hand 420 of the user 410 to perform touchless scanning on a person 710 and any objects on the person. To sense the contours of the person 710 and any objects on the person by penetrating through clothing, MMW sensors can be used.

The touchless scanning haptic feedback device 100 includes on its front surface 310 a sensor system 720 to detect the contour of a target (a person and/or an object) at a distance, optionally penetrating through clothing, to produce sensor data. The touchless sensor system 720 may include a plurality of touchless sensors 220. A mapping algorithm or module 730 is used to produce mapping data based on the sensor data of the detected contour. This can be done in real time. A simulator 740 is used to physically relay the detected contour to the user by generating haptic feedback based on the mapping data. A haptic feedback algorithm or module 745 is used to generate haptic feedback of the mapped contour based on the mapping data. This can also be done in real time. The tactile simulator 740 creates the sensation of touching the actual person or object to feel the surface topography or contour of the actual person or object. The user's palm and/or fingers are in contact with the haptic feedback pad 126 to receive simulated haptic feedback virtual sensation of touch based on the generated haptic feedback 760. A simulation system may include the mapping module 730, the simulator 740, and the haptic feedback module 745, to convert the sensor data into mapping data of the detected contour in real time, the mapping data representing the detected contour as a mapped contour, to generate the haptic feedback based on the mapping data and simulate the haptic feedback virtual sensation of touch of the mapped contour based on the generated haptic feedback in real time, and to physically relay the detected contour to at least one of a palm or a finger of the hand of the user via the haptic feedback virtual sensation of touch.

FIG. 8 is a flow diagram 800 illustrating an example of a touchless scanning haptic feedback method. In step 810, the operator puts on the wearable touchless scanning haptic feedback device 100 having touchless sensors 220, cameras 320, and haptic feedback 126, as the wearer of the device. In step 820, the cameras 320 are used, with software in the touchless scanning haptic feedback device 100, to determine the distance between the touchless sensors 220 and a person 710 and/or an object 610 as a target to be scanned. This may be done in real time. In step 830, when the distance indicates the target is within range of the touchless sensors 220, the sensors 220 are used to scan and detect a contour of the person or object at a distance to produce sensor data, optionally by penetrating through clothing. This can be done in real time. In step 840, the wearable device 100 has software 730 programmed to convert the sensor data into mapping data of the detected contour (e.g., by using MATLAB in general or mmW ProVision ATD for MMW scanning). The mapping data represents the detected contour as a mapped contour. This can be done in real time. In step 850, the wearable device 100 has software 745 programmed to generate the haptic feedback of the mapped contour based on the mapping data (e.g., by using a wearable tactile interface). This can be done in real time. In step 860, the wearable device 100 simulates the haptic feedback virtual sensation of touch of the mapped contour and physically relays the simulated sensation to the wearer via the haptic feedback pad 126. This can be done in real time.

An example of converting sensor data into mapping data of contours can be found in Muhammad Muftahul Munir et al., "Design of 3D Scanner for Surface Contour Mapping by Ultrasonic Sensor," The 5th Asian Physics Symposium (APS 2012), AIP Conference Proceedings 1656, 040006 (2015), which is incorporated herein by reference in its entirety.

An example of a wearable tactile interface can be found in Oliver Ozioko et al., "Wearable Assistive Tactile Communication Interface Based on Integrated Touch Sensors and Actuators," IEEE Transactions on Neural Systems and Rehabilitation Engineering, Vol. 28, No. 6, June 2020, pages 1344 to 1352, which is incorporated herein by reference in its entirety.

An example of haptic feedback based on quantitative three dimensional (Q3D) mapping is disclosed in U.S. Pat. No. 11,304,771 for SURGICAL SYSTEM WITH HAPTIC FEEDBACK BASED UPON QUANTITATIVE THREE-DIMENSIONAL IMAGING, which is incorporated herein by reference in its entirety. The patent discloses producing a Q3D model that includes information indicative of a measure of tissue structure deformation and providing the information indicative of the measure of tissue deformation to a haptic user interface device. An example of haptic feedback based on shape changes is disclosed in U.S. Pat. No. 9,977,498 for METHODS AND SYSTEMS FOR PROVIDING HAPTIC CONTROL, which is incorporated herein by reference in its entirety. The patent discloses using one or more arrays of shape change elements to actuate a screen surface, arrays to sense tactile interactions and stimuli on the screen surface, and an embedded haptic element in a contoured elastic sheet to provide tactile interactions to a user. An example of a haptic feedback based on motion tracking is disclosed in U.S. Pat. No. 9,104,271 for GLOVED HUMAN-MACHIE INTERFACE, which is incorporated herein by reference in its entirety. The patent discloses tracking movement of a gloved hand of a human, interpreting a gloved finger movement of the human, and providing haptic feedback to the human. A palm-sized vibrotactile array for haptic feedback is disclosed in Christoph W. Borst & Charles D. Cavanaugh, "Haptic Controller Design and Palm-sized Vibrotactile Array," EuroHaptics 2004, pp. 344-347, which is incorporated herein by reference in its entirety. An untethered hand wearable with fine-grained cutaneous haptic feedback device is disclosed in Alexander Co Abad et al., "A Novel Untethered Hand Wearable with Fine-Grained Cutaneous Haptic Feedback," Sensors 2022, 22(5), 1924, (published Mar. 1, 2022), which is incorporated herein by reference in its entirety. Examples of surface haptics can be found in Cagatay Basdogan et al., "A Review of Surface Haptics: Enabling Tactile Effects on Touch Surfaces," IEEE Transactions on Haptics, Vol. 13, No. 3, July-September 2020, which is incorporated herein by reference in its entirety.

Figure 9:
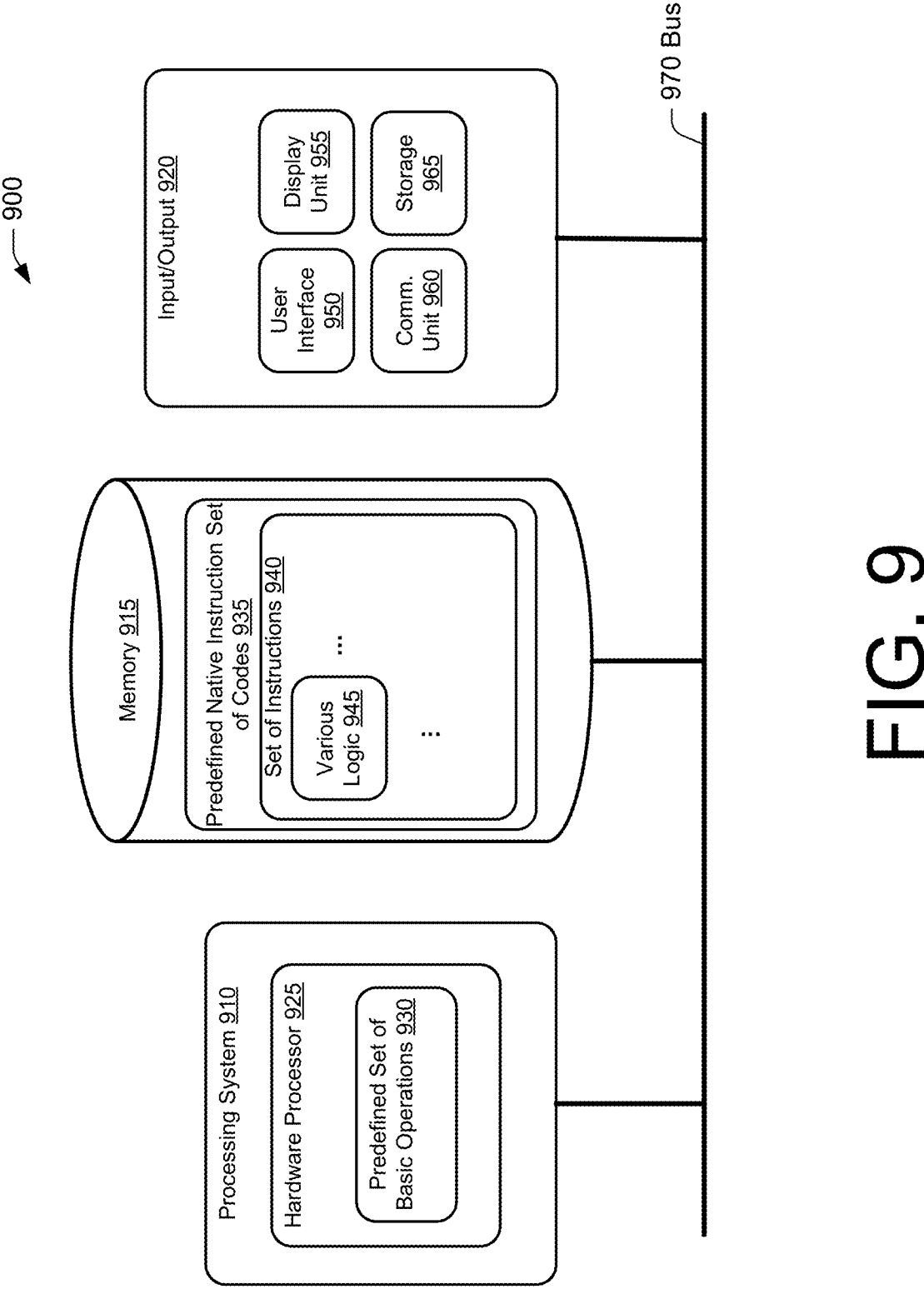
FIG. 9 illustrates a computing system including logic according to an embodiment.

FIG. 9 illustrates a computing system 900 including logic according to an embodiment. The computing system 900 includes a processing system 910 having a hardware processor 925 configured to perform a predefined set of basic operations 930 by loading corresponding ones of a predefined native instruction set of codes 935 as stored in the memory 915. The computing system 900 further includes input/output 920 having user interface 950, display unit 955, communication unit 960, and storage 965.

The memory 915 is accessible to the processing system 910 via the bus 970. The memory 915 includes the predefined native instruction set of codes 935, which constitute a set of instructions 940 selectable for execution by the hardware processor 925. In an embodiment, the set of instructions 940 include logic 945 representing various processor logic and/or modules. An example of such logic 945 is set forth in greater detail with respect to the flow diagram illustrated in FIG. 8. Each algorithm can be a separate system or a module in an overall computer system 900. The various logic 945 is stored in the memory 915 and comprises instructions 940 selected from the predefined native instruction set of codes 935 of the hardware processor 925, adapted to operate with the processing system 910 to implement the process or processes of the corresponding logic 945.

A hardware processor may be thought of as a complex electrical circuit that is configured to perform a predefined set of basic operations in response to receiving a corresponding basic instruction selected from a predefined native instruction set of codes. The predefined native instruction set of codes is specific to the hardware processor; the design of the processor defines the collection of basic instructions to which the processor will respond, and this collection forms the predefined native instruction set of codes. A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor. Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

A computer program product is an article of manufacture that has a computer-readable medium with executable program code that is adapted to enable a processing system to perform various operations and actions. Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. The following forms of storage exemplify non-transitory computer-readable media: removable storage such as a USB disk, a USB stick, a flash disk, a flash drive, a thumb drive, an external SSD, a compact flash card, an SD card, a diskette, a tape, a compact disc, an optical disc; secondary storage such as an internal hard drive, an internal SSD, internal flash memory, internal non-volatile memory, internal DRAM, ROM, RAM, and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

Certain attributes, functions, steps of methods, or substeps of methods described herein may be associated with physical structures or components, such as a module of a physical device that, in implementations in accordance with this disclosure, make use of instructions (e.g., computer executable instructions) that are embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

An interpretation under 35 U.S.C. § 112 (f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A touchless scanning haptic feedback device comprising:

a touchless sensor system to detect a contour of a physical target, at a distance from the physical target to produce sensor data, without making physical contact with the physical target, the physical target being at least one of a person or an object; and a tactile simulation system to physically relay the detected contour to a user by generating haptic feedback based on the sensor data and simulating haptic feedback virtual sensation of touch based on the generated haptic feedback which is indicative of the detected contour of the physical target;

the touchless sensor system including a MMW (Millimeter Wave) sensor to sense the contour by penetrating through clothing, the MMW sensor being disposed on an exterior surface of a wearable device to be worn on a hand of the user.

2. The touchless scanning haptic feedback device of claim 1,
  wherein the tactile simulation system is configured to convert the sensor data into mapping data of the detected contour in real time, the mapping data representing the detected contour as a mapped contour.

3. The touchless scanning haptic feedback device of claim 2,
  wherein the tactile simulation system is configured to generate the haptic feedback based on the mapping data and simulate the haptic feedback virtual sensation of touch of the mapped contour based on the generated haptic feedback in real time.

4. The touchless scanning haptic feedback device of claim 1, comprising a wearable device which includes the touchless sensor system and the tactile simulation system,
  wherein the tactile simulation system is configured to physically relay the detected contour to at least one of a palm or a finger of a hand of the user via the haptic feedback virtual sensation of touch.

5. The touchless scanning haptic feedback device of claim 4, wherein the tactile simulation system is configured to physically relay the detected contour to at least the palm of the hand of the user via the haptic feedback virtual sensation of touch.

6. The touchless scanning haptic feedback device of claim 1,
  wherein the tactile simulation system is configured to convert the sensor data into mapping data of the detected contour in real time, the mapping data representing the detected contour as a mapped contour, to generate the haptic feedback based on the mapping data and simulate the haptic feedback virtual sensation of touch of the mapped contour based on the generated haptic feedback in real time, and to physically relay the detected contour to at least one of a palm or a finger of the hand of the user via the haptic feedback virtual sensation of touch in real time.

7. The touchless scanning haptic feedback device of claim 6,
  wherein the tactile simulation system is configured to physically relay the mapped contour to one or more fingers of the hand of the user via the haptic feedback virtual sensation of touch using a haptic feedback pad disposed on an interior surface of the wearable device to contact the one or more fingers to imitate a sensation of touch, the haptic feedback pad including a haptic interface to simulate the haptic feedback virtual sensation of touch to the one or more fingers of the hand of the user in real time.

8. The touchless scanning haptic feedback device of claim 7,
  wherein the haptic feedback pad includes a plurality of ridges to be positioned between the fingers of the hand of the user.

9. The touchless scanning haptic feedback device of claim 8,
  wherein the plurality of ridges are adjustable in position to accommodate fingers of different sizes of a variety of users.

10. The touchless scanning haptic feedback device of claim 1, further comprising:
  at least one camera on the wearable device to determine a distance between the MMW sensor and the physical target;
  wherein the tactile simulation system is configured to sense the contour by penetrating through clothing using the MMW sensor when the distance indicates the physical target is within range of the MMW sensor.

11. A touchless scanning haptic feedback method comprising:
  detecting a contour of a physical target at a distance from the physical target to produce sensor data, without making physical contact with the physical target, the physical target being at least one of a person or an object;
  physically relaying the detected contour to a user by generating haptic feedback based on the sensor data and simulating haptic feedback virtual sensation of touch based on the generated haptic feedback which is indicative of the detected contour of the physical target; and
  detecting the contour including sensing the contour by penetrating through clothing with a sensor.

12. The touchless scanning haptic feedback method of claim 11, further comprising:
  converting the sensor data into mapping data of the detected contour in real time, the mapping data representing the detected contour as a mapped contour; and
  generating haptic feedback based on the sensor data and simulating haptic feedback virtual sensation of touch based on the generated haptic feedback in real time.

13. The touchless scanning haptic feedback method of claim 12, further comprising:
  physically relaying the mapped contour to at least one of a palm or a finger of a hand of the user via the haptic feedback virtual sensation of touch in real time.

14. The touchless scanning haptic feedback method of claim 13, wherein physically relaying the mapped contour comprises:
  physically relaying the mapped contour to at least the palm of the hand of the user via the haptic feedback virtual sensation of touch in real time.

15. The touchless scanning haptic feedback method of claim 11, wherein detecting the contour comprises:
  sensing the contour by penetrating through clothing using a MMW (Millimeter Wave) sensor disposed on an exterior surface of a wearable device to be worn on a hand of the user.

16. The touchless scanning haptic feedback method of claim 15, further comprising:
  converting the sensor data into mapping data of the detected contour in real time, the mapping data representing the detected contour as a mapped contour;
  generating haptic feedback based on the sensor data and simulating haptic feedback virtual sensation of touch based on the generated haptic feedback in real time; and
  physically relaying the mapped contour to at least one of a palm or a finger of the hand of the user via the haptic feedback virtual sensation of touch using a haptic feedback pad disposed on an interior surface of the wearable device to contact at least one of the palm or the finger of the hand, the haptic feedback pad including a haptic interface to simulate the haptic feedback virtual sensation of touch to the at least one of the palm or the finger of the hand of the user in real time.

17. The touchless scanning haptic feedback method of claim 16, further comprising:
  physically relaying the mapped contour to one or more fingers of the hand of the user via the haptic feedback virtual sensation of touch using the haptic feedback pad disposed on the interior surface of the wearable device to contact the one or more fingers to imitate a sensation of touch in real time.

18. The touchless scanning haptic feedback method of claim 17, further comprising:

positioning a plurality of ridges on the haptic feedback pad between the fingers of the user.

19. The touchless scanning haptic feedback method of claim 18, further comprising:

adjusting positions of the plurality of ridges to accommodate fingers of different sizes of a variety of users.

20. The touchless scanning haptic feedback method of claim 15, further comprising:

determining a distance between the MMW sensor and the physical target using at least one camera on the wearable device; and sensing the contour by penetrating through clothing using the MMW sensor when the distance indicates the physical target is within range of the MMW sensor.

21. A wearable touchless scanning haptic feedback device comprising:

a touchless sensor system to detect a contour of a physical target, at a distance from the physical target to produce sensor data, without making physical contact with the physical target, the physical target being at least one of a person or an object; and a tactile simulation system to physically relay the detected contour to at least a palm of an operator's hand by generating haptic feedback based on the sensor data, simulating haptic feedback virtual sensation of touch based on the generated haptic feedback which is indicative of the detected contour of the physical target, and applying the haptic feedback virtual sensation of touch via physical contact with at least the palm of the operator's hand.

22. The wearable touchless scanning haptic feedback device of claim 21, wherein the touchless sensor system comprises a MMW (Millimeter Wave) sensor to sense the contour by penetrating through clothing, the MMW sensor being disposed on an exterior surface of the wearable touchless scanning haptic feedback device to be worn on the operator's hand.

23. The wearable touchless scanning haptic feedback device of claim 22:

wherein the tactile simulation system is configured to convert the sensor data into mapping data of the detected contour in real time, the mapping data representing the detected contour as a mapped contour, to generate the haptic feedback based on the mapping data and simulate the haptic feedback virtual sensation of touch of the mapped contour based on the generated haptic feedback in real time, and to physically relay the detected contour to at least the palm of the operator's hand via the haptic feedback virtual sensation of touch in real time.

24. The wearable touchless scanning haptic feedback device of claim 23, further comprising:

an interior surface having a haptic feedback pad including a haptic interface to simulate the haptic feedback virtual sensation of touch to the palm and one or more fingers of the operator's hand;

wherein the tactile simulation system is configured to physically relay the detected contour to one or more fingers of the operator's hand via the haptic feedback virtual sensation of touch using the haptic feedback pad disposed on the interior surface of the wearable touchless scanning haptic feedback device to contact the one or more fingers to imitate a sensation of touch in real time.

25. The wearable touchless scanning haptic feedback device of claim 24, wherein the haptic feedback pad includes a plurality of ridges to be positioned between the fingers of the operator's hand.

26. The wearable touchless scanning haptic feedback device of claim 25, wherein the plurality of ridges are adjustable in position to accommodate fingers of different sizes of a variety of operators.

27. The wearable touchless scanning haptic feedback device of claim 21, further comprising:

at least one camera to determine a distance between the touchless sensor system and the physical target;

wherein the tactile simulation system is configured to sense the contour when the distance indicates the physical target is within range of the touchless sensor system.

* * * * *